United States Patent [19]

Rose

[11] Patent Number: 5,708,443
[45] Date of Patent: Jan. 13, 1998

[54] METHOD AND APPARATUS FOR USING SIGNAL DOPPLER CHANGE TO RESOLVE LONG BASELINE INTERFEROMETER AMBIGUOUS PHASE CHANGE MEASUREMENTS FOR LOCATING A RADAR EMITTER

[75] Inventor: Conrad M. Rose, Dahlgren, Va.

[73] Assignee: Litton Systems Inc., Woodland Hill, Calif.

[21] Appl. No.: 693,546

[22] Filed: Aug. 7, 1996

[51] Int. Cl.$^6$ .................................................. G01S 5/04
[52] U.S. Cl. .......................................... 342/442; 342/424
[58] Field of Search .................................. 342/442, 424, 342/418

[56] References Cited

U.S. PATENT DOCUMENTS

| | | | |
|---|---|---|---|
| 4,734,702 | 3/1988 | Kaplan | 342/424 |
| 4,975,710 | 12/1990 | Baghdady | 342/442 |
| 5,343,212 | 8/1994 | Rose et al. | 342/424 |

*Primary Examiner*—Gregory C. Issing
*Attorney, Agent, or Firm*—Gerald L. Lett

[57] ABSTRACT

Radar emitter carrier frequency or pulse time-of-arrival measurements are used to resolve the differential phase measurement ambiguities on a long baseline interferometer (LBI) used to passively locate the emitter. The LBI requires only two pulses to precisely measure the change in signal angle of arrival caused by observer motion relative to the emitter, whereas frequency Doppler needs tens of pulses, and time Doppler may need hundreds of pulses, to estimate the same change to the same accuracy. Therefore Doppler measurements are made only to the accuracy needed to estimate the angle change accurately enough to differentially resolve the LBI.

5 Claims, 3 Drawing Sheets

METHOD AND APPARATUS FOR USING SIGNAL DOPPLER CHANGE TO RESOLVE LONG BASELINE INTERFEROMETER AMBIGUOUS PHASE CHANGE MEASUREMENTS FOR LOCATING A RADAR EMITTER

BACKGROUND OF THE INVENTION

1. Field of Invention

This invention relates to a method and apparatus for the resolution of phase difference ambiguities encountered when using a long baseline interferometer (LBI) to measure angle changes in a radar emitter signal being geolocated.

2. Background of the Invention

As discussed in A. L. Haywood, "Passive Ranging by Phase Rate Techniques" (Wright-Patterson AFB Tech. Report ASD-TR-70-46, Dec. 1970), accurate ranging to an emitter requires only the precise measurement of emitter bearing rate-of-change. If a long baseline interferometer (LBI) is used to measure phase rate of change, this means that differential, not absolute, resolution of the phase measurement ambiguity is required.

Commonly assigned U.S. Pat. No. 4,734,702 to Kaplan describes a method using a fully resolved short baseline interferometer (SBI) to differentially resolve an ambiguous LBI. However, many aircraft used to passively locate emitters do not currently have an SBI available. Furthermore, because of weight, cost and airframe limitations it may not be feasible to add an SBI to the existing electronic surveillance measurement (ESM) system.

To overcome this limitation, the applicant herein disclosed a method in commonly assigned U.S. Pat. 5,343,212 to resolve the LBI based on a hypothesis test partially implemented in software. The hypothesis test generates a set of potential emitter locations, resolves the LBI in a manner consistent with each of these assumed locations, and utilizes a sequential check over a number of measurements to determine the correct emitter location from the set. While robust, this method can be processing intensive.

Therefore, it is an object of this invention to provides a way in passive ranging to avoid either the use of a processing intensive hypothesis test approach, or the need for an SBI to resolve the LBI phase ambiguities.

It is another object to accomplish the above stated object by using special design features that may be intrinsic to the radar being located.

SUMMARY OF THE INVENTION

Radar emitters being located have a RF carrier frequency phase coherence necessary for the radar to extract its target's velocity from Doppler measurements, and they have a pulse repetition interval (PRI) coherence required for range ambiguity resolution and clutter cancellation. Either of these aspects characteristic of fire control radar signals can be used to resolve the LBI. This is done by utilizing the radar signal coherence at the ESM intercept receiver to measure either the time Doppler change (from PRI measurements) or frequency Doppler change (from RF carrier measurements). Either of these Doppler changes can be used to measure an angle change, which can then be used to predict the LBI ambiguity integer, and hence resolve the LBI.

The single antenna cos(AOA) estimates derived from Doppler change measurements are combined to resolve the ambiguous two-antenna generated LBI cos(AOA) difference measurements. LBI measurement accuracy, for given system errors, is a function of the interferometer baseline length, while Doppler change measurement errors are intrinsically limited by receiver performance and transmitter oscillator stability. Thus, although it is possible to locate the emitter using Doppler change measurements, it is more desirable to use the superior resolution accuracy of the LBI.

The relatively inaccurate angle changes derived from Doppler measurements are used only to only predict the ambiguity integer on the long baseline phase measurements. Then the highly accurate LBI phase changes are used to quickly locate the emitter. Thus single-antenna derived Doppler change measurements are used as a substitute for the antenna-array-derived SBI measurements in resolving the LBI, and with this substitution the ranging approach is analogous to that described in the Kaplan patent.

DETAILED DESCRIPTION OF THE DRAWINGS

As more fully described in U.S. Pat. No. 5,343,212, the LBI differentially measures the ambiguous change in the cosine of the signal angle-of-arrival (AOA):

$$\cos(aoa_{j+1}) - \cos(aoa_j) = \frac{\lambda}{2\pi d} [\phi_{j+1} - \phi_j] + \frac{\lambda}{d} [n_{j+1} - n_j] \quad (1)$$

where $aoa_k = k^{th}$ angle of arrival (LBI relative)

Figure 1:
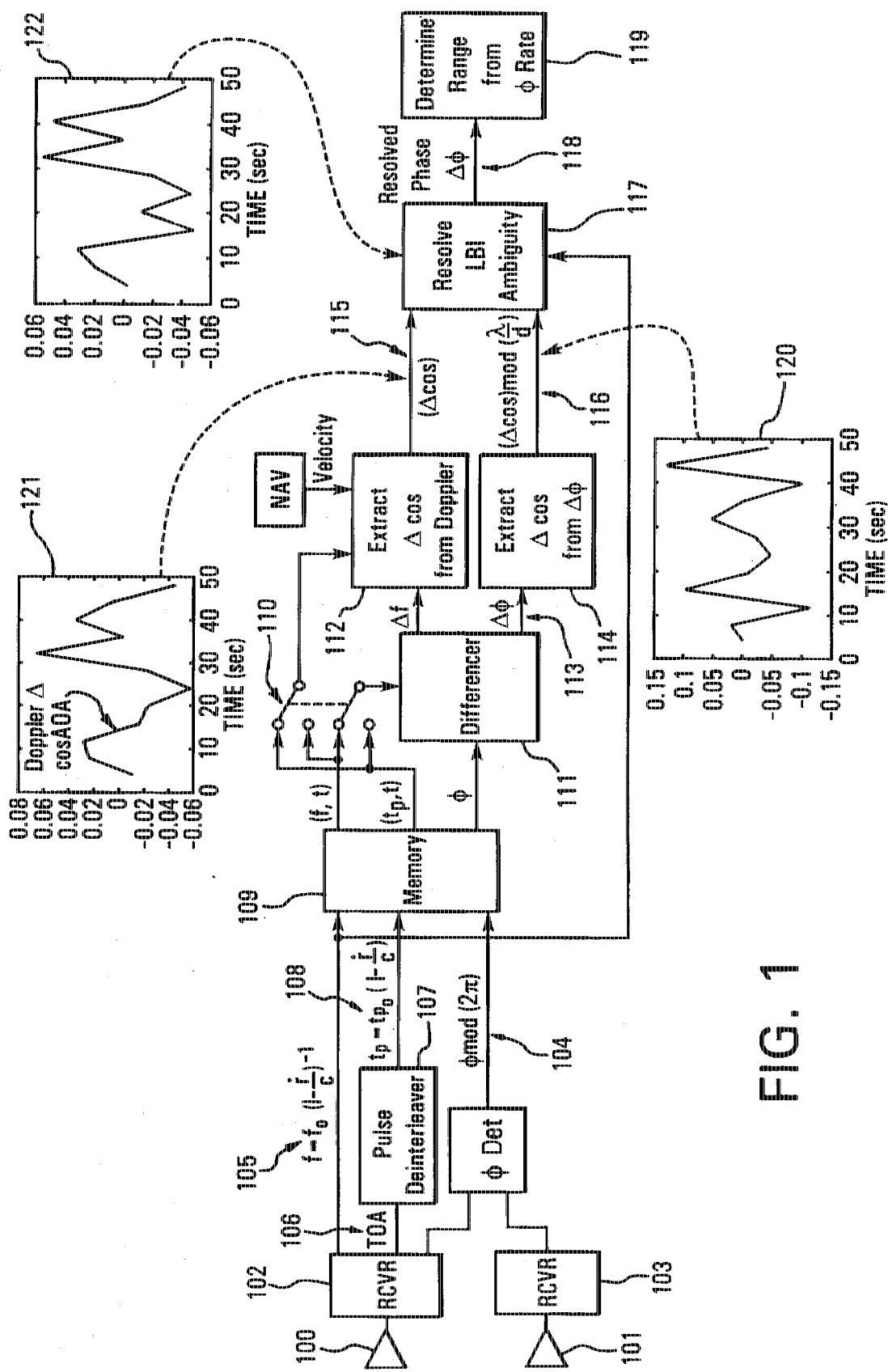
FIG. 1 is a block-schematic diagram of an apparatus constructed to operate according to the invention.

$\phi_k = k^{th}$ LBI phase measurement $\lambda =$ emitter signal wavelength $d =$ LBI baseline length $n_k =$ phase ambiguity integer on $k^{th}$ LBI measurement LBI ambiguity resolution requires determining the integer difference $$m = n_{j+1} - n_j$$

in Equation (1). To illustrate the use of signal Doppler change to estimate this integer difference, RF carrier measurements will be employed, although as indicated in FIG. 1, pulse time of arrival (TOA) measurements can be used in an analogous way. The ESM intercept receiver measures, at the $j^{th}$ update, the RF carrier frequency $f_{rj}$, which is related to the emitter rest frequency $f_{rf_o}$ by $$f_{rf}(j) = f_{rf_o}\left(1 + \frac{v}{c}\cos(aoa_j)\right) \quad (2)$$

where v is the observer's speed and c the speed of light. Although $f_{rf_o}$ is not known, measuring $$\frac{f_{rf}(j+1) - f_{rf}(j)}{f_{rf}(j)} \quad (3a)$$

cancels the rest frequency, and gives an unambiguous estimate of the cosine AOA difference, since $$\frac{f_{rf}(j+1) - f_{rf}(j)}{f_{rf}(j)} = \frac{v}{c}(\cos(aoa_{j+1}) - \cos(aoa_j)) + o\left(\left(\frac{v}{c}\right)^2\right) \quad (3b)$$

Making the measurement indicated by Equation (3) and using this measurement to resolve the LBI is an intrinsic aspect of this invention. Rather than the signal RF carrier, the right hand side of Equation (3b) could be measured substituting the fundamental pulse repetition frequency $f_{prf}$ for $f_{rf}$ on the left hand side. In radars using multiple pulse repetition frequencies (PRFs) to resolve range ambiguities, $f_{prf}$ represents the highest PRF frequency. A common approach in such radars to eliminate range ambiguities in the received signal is to make the different PRFs relatively prime integer multiples of a fundamental time interval $t_p$, where $t_p$ is equal to $1/f_{prf}$. Modern pulse deinterleavers, such as the Litton Industries Amecom Division's Advanced Capabilities (ADVCAP) Deinterleaver developed for the AN/ALQ-99 jamming system, extract $t_p$ from the pulse time of arrival (TOA) measurements made by an ESM intercept receiver (FIG. 1).

If $f_{rf}$ is measured, the ratio shown in Equation (3) is used to resolve the LBI differential ambiguity by adding or subtracting integers m until the inequality $$-\pi\frac{d}{\lambda} < \left(\frac{1}{2\pi}(\phi_{m_{j+1}} - \phi_{m_j}) - \frac{cd}{v\lambda}\frac{f_{rf}(j+1) - f_{rf}(j)}{f_{rf}(j)} - m\right) < \pi\frac{d}{\lambda} \quad (4)$$

is satisfied. But as noted above, $f_{prf}$, or equivalently $t_p$, can be used in place of $f_{rf}$ in this equation. The method by which these quantities are generated and used is discussed below.

Referring to FIG. 1, the two channel intercept receivers 102 and 103 measure signal phase differences between the antennas 100 and 101. The spacing between these antennas may be hundreds of inches, and therefore the measured phase 104 corresponding to the signal, which typically is in the 2GHz to 18 GHz frequency region, is highly ambiguous.

Figure 2:
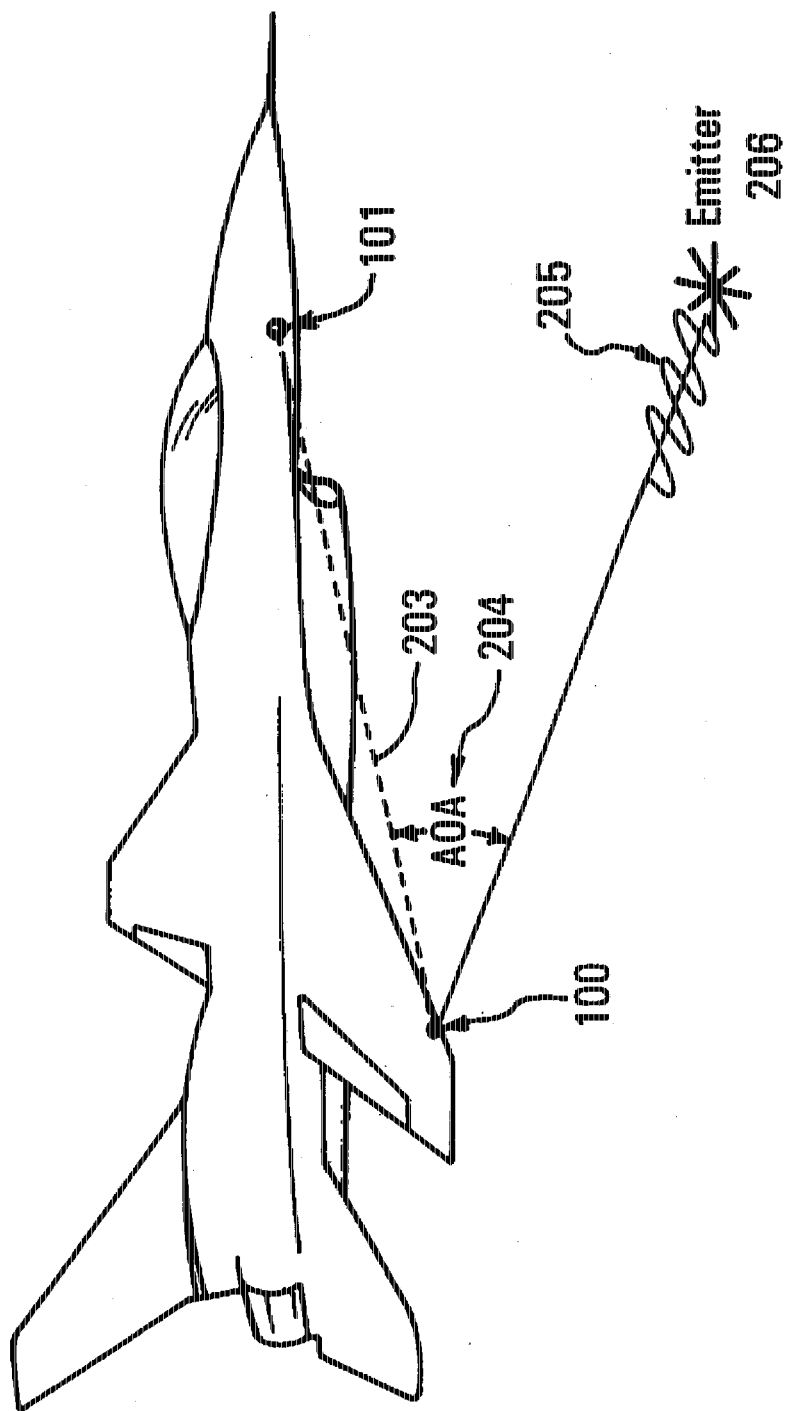
FIG. 2 is a perspective view illustrating the use of the antennas on the aircraft to measure both signal Doppler change and angle-of-arrival according to the invention.
Figure 3A:
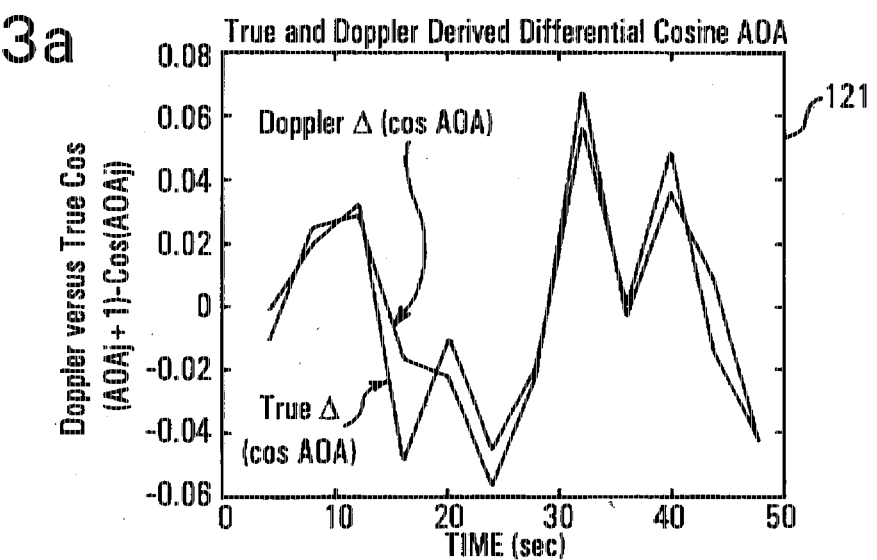
FIG. 3a is a graph comparing the true cosine AOA difference and the frequency derived estimate of cosine AOA; estimating this quantity more accurately with frequency measurements would require many more pulses per dwell than the five needed for practicing the invention.
Figure 3B:
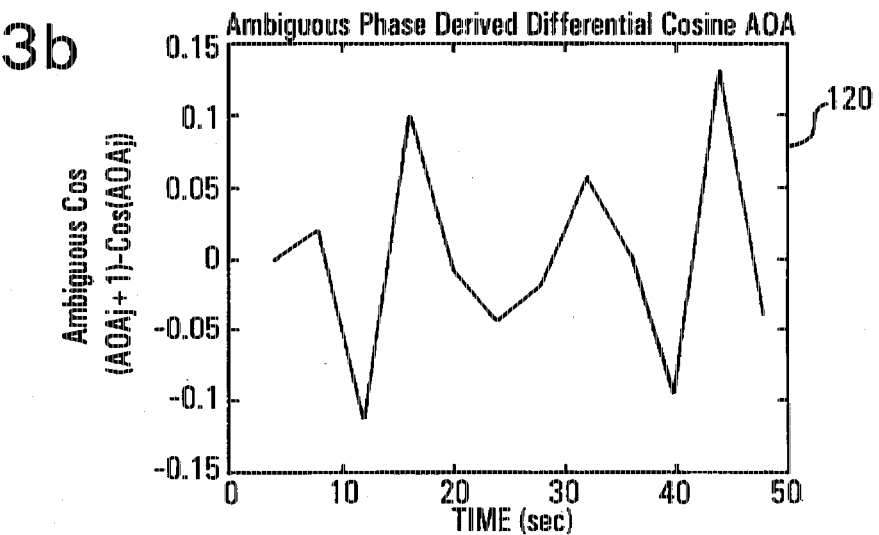
FIG. 3b is a graph showing the ambiguous cosine AOA derived from LBI phase measurements using an 80 inch baseline.
Figure 3C:
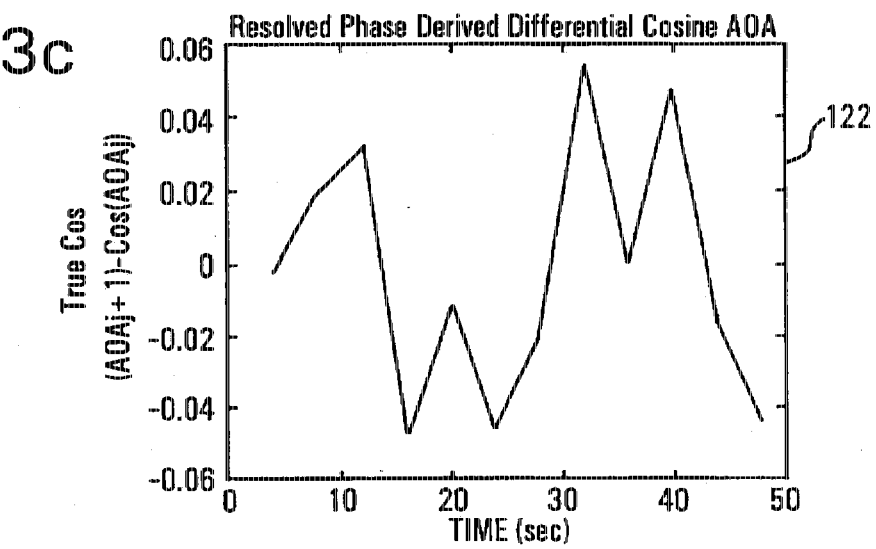
FIG. 3c is a graph showing the resolved LBI cosine AOA which cannot be distinguished from the true cosine AOA shown in FIG. 3a, even though only an 80 inch baseline was used. (The system phase error in this example is 12 electrical degrees).

FIG. 2 indicates possible placement of the antennas 100 and 101 on a typical fighter airframe. Antenna 100 in FIG. 2 is the existing radar warning receiver (RWR) antenna, while antenna 101 is a spiral broadband antenna conformally mounted on the fuselage. Since phase difference measurements are being made (113, FIG. 1), these two antennas do not have to phase track, as do the antennas forming the baseline in a conventional interferometer.

Referring again to FIG. 1, a single receiver 102 and antenna 100 is used to measure carrier frequency 105 and pulse time-of-arrival 106 of the incoming emitter signal. The receiver is assumed to have a frequency measurement resolution of 5Hz and TOA resolution of 2.5 nsec. The received pulses are deinterleaved 107 and the largest common divisor of the PRI intervals, $t_p$ 108, extracted. These operations of phase measurement, frequency measurement and $t_p$ (equivalently $f_{prf}$) extraction all occur during a single dwell, and the results for the dwell are stored in memory 109. (A "dwell" is the time period the receivers are tuned to the approximate emitter frequency).

The measurements between dwells are differenced 111 and the Δcos(aoa) estimate 115 derived according to Equation (3) in processor 112. FIG. 2 204 shows the AOA, or emitter-interferometer cone angle for the illustrated example. In generating this estimate either $f_{rf}$ or $t_p$ can be used, as indicated by switch 110. If frequency phase coherence is available, there is an advantage to using $f_{rf}$ since it can be estimated more quickly, i.e., by utilizing fewer pulses, than $t_p$. However, $t_p$ estimation is available for many emitters that are not phase coherent. Many radars, especially acquisition radars, are PRF, but not RF, coherent.

Processor 114 extracts Δcos(aoa) 116, 120 from the ambiguous phase change measurements 113 measured on the LBI baseline (203 FIG. 2) in accord with the relationship shown in Equation (1). The ambiguity integer difference is found in processor 117 according to the relationship shown in Equation (4).

The following scenario was used to generate performance results. A 2 GHz signal with a signal-to-noise ratio (SNR) at the intercept receiver of 13dB was assumed. The emitter had a relative bearing of 30° and was 60 nmi from the aircraft. The aircraft was flying 480 kts at an altitude of 10000 feet. The carrier frequency $f_{rf}$ was measured to a 25 Hz 1σ accuracy, which for the 500 μsec PRI and SNR assumed required about 5 pulses. The error in the Δcos(aoa) estimate 115, 121 derived from frequency has an error 104 greater than the Δcos(aoa) estimate 116, 120 derived from phase, after the ambiguity resolution process 117 (FIG. 1). This illustrates why the frequency measurement is only used to resolve the ambiguity on the LBI measurement, and not to locate the emitter directly.

The resolved phase measurement (118, 122 FIG. 1) can then be used by a conventional phase rate algorithm 119 to locate the emitter. This can be done in two ways. If angle measurements are also available, the technique described in the Kaplan patent can be used. If no separate angle measurement is available, the technique described in the '212 patent can be used, but in a much simpler form than the range and angle hypothesis test described there. Because the LBI phase difference measurement is fully resolved, no range hypotheses are needed, and only angle hypotheses must be tested. This reduces the number of hypotheses that must be tested by a factor of one thousand in some cases, and in all cases greatly reduces the processing required.

To use the location method described in the Kaplan patent the emitter direction-of-arrival (DOA) is needed. Kaplan obtains this measurement using the short baseline interferometer. Since it is desirable to avoid the use of an SBI altogether, a better approach is to use the signal Doppler change to find the DOA unit vector by varying the observer heading over a number of receiver dwells. A method for doing this is given in a commonly assigned patent application entitled "Moving Emitter Elevation and Azimuth Direction from Doppler Change Measurements" Ser. No. 08/800, 561 filed, Feb. 20, 1997, Litton Systems, Inc. Docket No. AME-1397.

I claim:

1. An apparatus for locating a radar emitter by resolving long baseline interferometer (LBI) ambiguous differential phase measurements comprising:

two antennas having a common field of view forming the LBI baseline, with this baseline not necessarily being phase calibrated, two receiver channels connected to said antennas to detect and measure the signal angle-of-arrival induced phase difference on this baseline, a one of said antennas being connected to a one of said receivers including means for measuring signal pulse time-of-arrival and signal carrier frequency, a memory device to store the frequency and phase measurements made each receiver dwell, a differencer for receiving the frequency data from said memory, and for forming therefrom the difference between frequency values measured in two different dwells, for dividing this result by the frequency measured in the earlier dwell of the two being used to produce a normalized frequency quantity, and for determining the corresponding phase difference measurements, a first scaling device that multiplies the differenced and normalized frequency quantities from said differencer by a scaling factor based on the observer's speed, producing a measurement of the differential of the cosine of the signal angle-of-arrival (AOA), this AOA being the angle that would be measured at the corresponding dwell, but which is not required to be measured directly, a second device that multiplies the ambiguous phase difference measured on the LBI baseline by a scaling factor based on measured emitter frequency and baseline length, producing a measurement of the differential of the cosine of the signal angle-of-arrival, this differential corresponding to that calculated by said first scaling device, first means for comparing frequency-derived and ambiguous phase-derived cosine AOA change estimates and for adjusting the phase estimate by addition of properly scaled positive or negative integer values until the absolute value of the difference between the two measurements has a value less than $\pi$, thereby resolving phase ambiguity and processor means for using the output from said first means for comparing for locating the radar emitter.

2. The apparatus of claim 1 where said one receiver measuring frequency measures in addition signal pulse time-of-arrivals (TOAs), and further comprising a pulse deinterleaver to extract from the TOAs from said one receiver a periodic event representing an invariant time interval at the radar, this event defining an interpulse repetition of pulse patterns in the radar signal, and referred to as $t_{po}$ at the radar, and as $t_p$ at the observer, means in said memory device for storing the $t_p$ and phase measurements made each receiver dwell, said differencer additionally receiving $t_p$ data from said memory, for forming the difference between inverse values of $t_p$ (these inverse values forming the pulse repetition frequency estimate $f_{prf}$) where the values are measured in two different dwells, for dividing this result by the $f_{prf}$ estimate in the earlier dwell of the two being used, and for determining the corresponding phase difference measurements, a third scaling device for multiplying said differenced and normalized $f_{prf}$ quantity by a scaling factor based on the observer's speed producing a measurement of the differential of the cosine of the signal angle-of-arrival (AOA), this AOA being the angle that would be measured at the corresponding dwell, but which is not required to be measured directly, a fourth scaling device for multiplying an ambiguous phase difference measured on the LBI baseline by a scaling factor based on measured emitter frequency and baseline length, producing a measurement of the differential of the cosine of the signal angle-of-arrival, this difference corresponding to that measured by said third scaling device, second means for comparing the $t_p$-derived and ambiguous phase-derived cosine AOA change estimates and for adjusting the phase estimate by addition of properly scaled positive or negative integer values until the absolute value of the difference between the two measurements has a value less than $\pi$, thereby resolving phase ambiguity and said processor means using the output from said second means for comparing for locating the radar emitter.

3. This apparatus described in claim 1 wherein said processor uses a phase rate algorithm to locate the radar emitter.

4. A method for locating a radar emitter by using a long baseline interferometer (LBI) and for resolving ambiguous differential phase measurements made by said LBI, comprising the steps of:

forming the LBI baseline between two antennas having a common field of view, measuring the signal angle-of-arrival (AOA) induced phase difference on the baseline, measuring emitter signal carrier frequency, calculating a difference value between the frequency values measured in two different dwells, dividing said difference by the frequency by the frequency measured in the earlier of said two dwells to yield a normalized frequency value, multiplying said frequency difference and normalized frequency values producing a first value corresponding to the differential of the cosine of the signal AOA, multiplying the ambiguous phase difference measured on the LBI baseline by a scaling factor derived from measured emitter frequency and baseline length to yield a second value corresponding to the differential of the cosine of the signal AOA, comprising said first and second differential values and adjusting the value of said second differential value by properly scaled positive or negative integers until the absolute value of the difference between said first and second values is less that $\pi$ thereby resolving phase ambiguity and using the value resulting from said comparing and adjusting step to locate the radar emitter.

5. A method for locating a radar emitter by using a long baseline interferometer (LBI) and for resolving ambiguous differential phase measurements made by said LBI, comprising the steps of:

forming the LBI baseline between two antennas having a common field of view, measuring the signal angle-of-arrival (AOA) induced phase difference on the baseline, measuring emitter pulse time-of-arrival (TOA)

extracting from TOA values a periodic event representing an invariant time interval at the radar or an inter-pulse repetition of pulse patterns in the radar signal referred to as $t_{po}$ at the radar and $t_p$ at the observer, calculating a difference between inverse values of $t_p$ between two dwells forming a pulse repetition frequency estimate $f_{prf}$ and dividing this result by a $f_{prf}$ estimate in the earlier dwell of the two being used for determining a phase difference value, multiplying said differenced and normalized $f_{prf}$ values by a scaling factor derived from the observer's speed producing a first differential value of the cosine of the signal AOA, multiplying an ambiguous phase difference measured on the LBI baseline by a scaling factor derived from measured emitter frequency and baseline length producing a second differential value of the cosine of the signal AOA comparing said first and second differential values and adjusting said second differential value by the addition of properly scaled positive or negative integer values until the absolute value of the difference between the two measurements has a value less than $\pi$ thereby resolving phase ambiguity and using the value resulting from said comparing and adjusting step to locate the radar emitter.

* * * * *